United States Patent [19]

Dietzsch et al.

[11] 4,016,964
[45] Apr. 12, 1977

[54] ROTOR FOR CENTRIFUGAL CLUTCH

[75] Inventors: Günter Dietzsch, Schmiden; Gerd Frers, Weinstadt; Klaus Henning, Stuttgart; Helmut Lux, Waiblingen, all of Germany

[73] Assignee: Andreas Stihl Maschinenfabrik, Neustadt, Germany

[22] Filed: Mar. 3, 1976

[21] Appl. No.: 663,293

[30] Foreign Application Priority Data

Mar. 5, 1975 Germany .................. 7506785[U]

[52] U.S. Cl. ......................................... 192/105 CD
[51] Int. Cl.[2] ......................................... F16D 43/06
[58] Field of Search ............. 192/105 BA, 105 CD, 192/105 CE, 103 B, 107 T

[56] References Cited

UNITED STATES PATENTS

| | | | |
|---|---|---|---|
| 2,670,829 | 3/1954 | Bruestle | 192/105 BA |
| 2,762,484 | 9/1956 | Hare | 192/105 CD |
| 3,718,214 | 2/1973 | Newman | 192/105 CD |

Primary Examiner—Benjamin W. Wyche
Attorney, Agent, or Firm—Walter Becker

[57] ABSTRACT

A rotor for a centrifugal clutch which rotor is designed as an axially laminated packet and is provided with a central supporting element carrying at least two circular segmental centrifugal weights respectively having one end thereof connected to the supporting element by an elastic supporting member.

19 Claims, 6 Drawing Figures

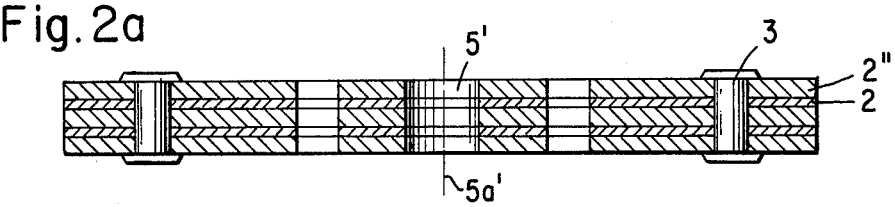
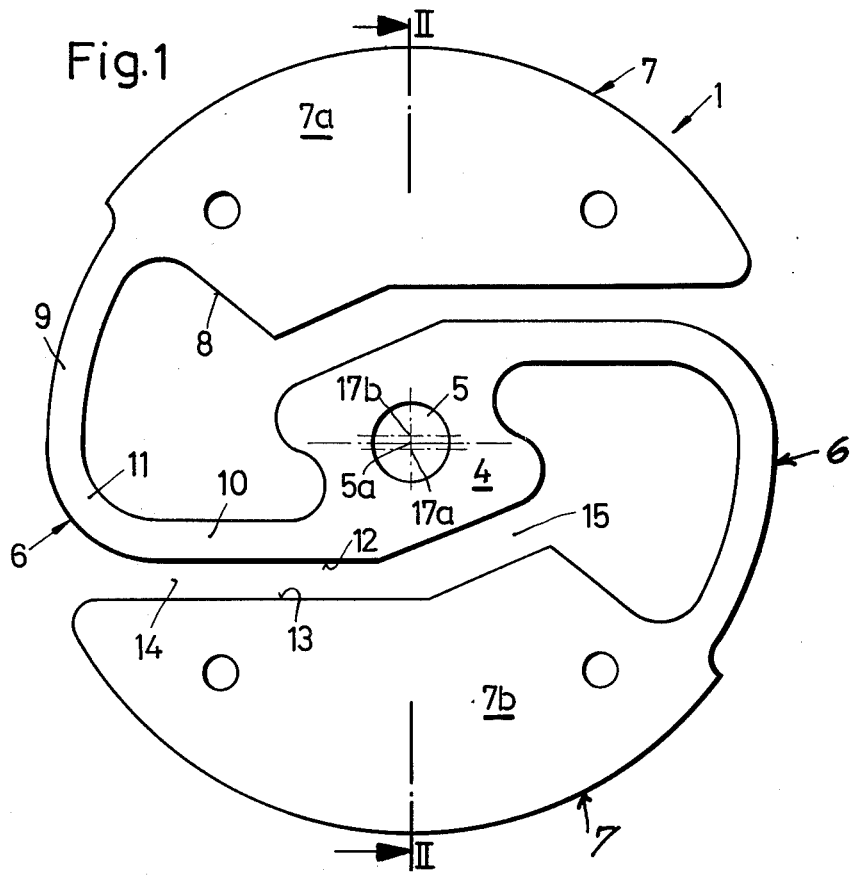
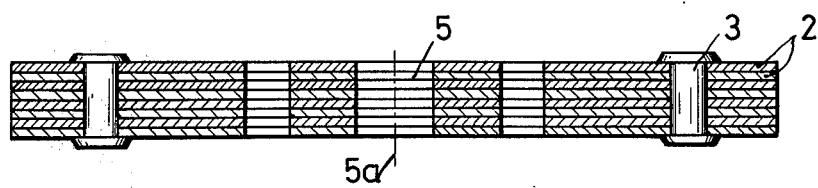

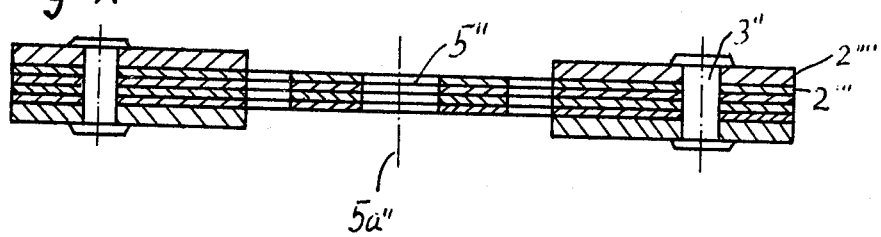
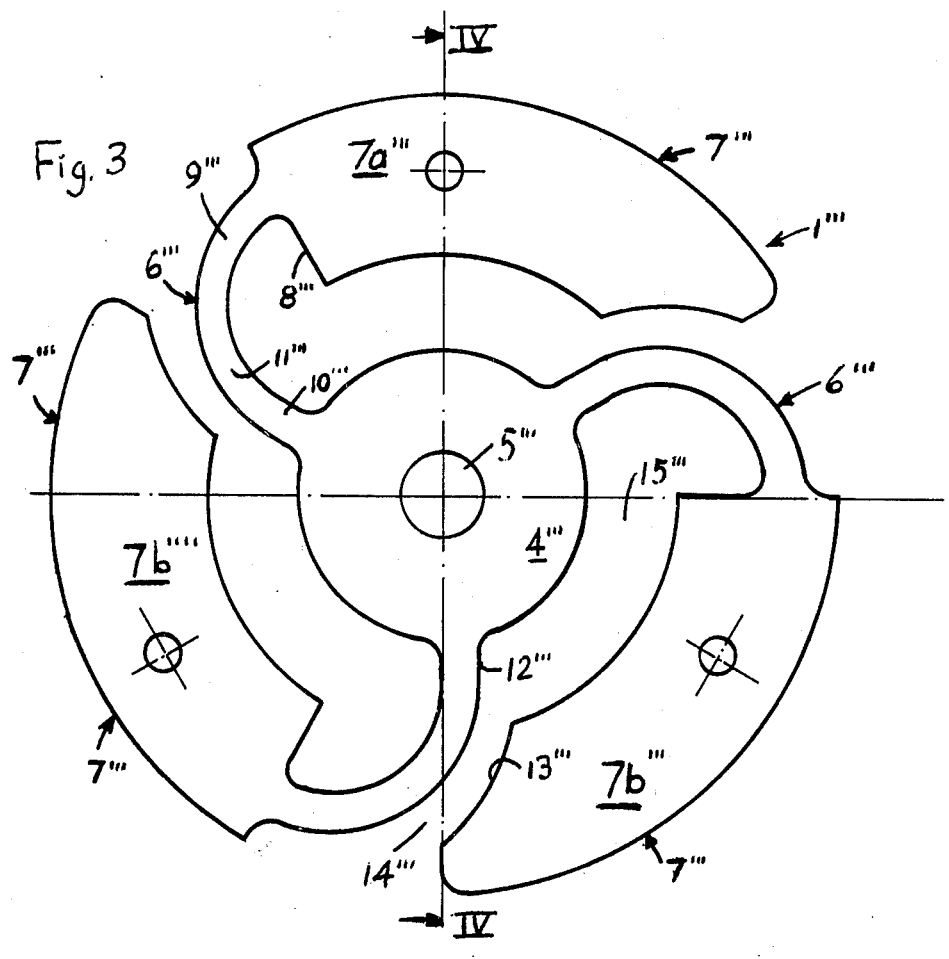
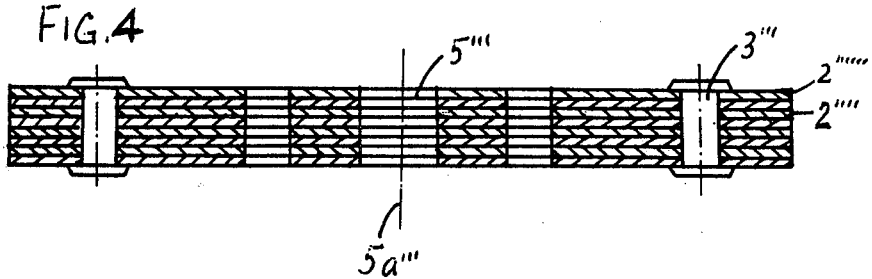

ROTOR FOR CENTRIFUGAL CLUTCH

The present invention relates to a rotor for a centrifugal clutch with a central supporting element for at least two circular segment shaped centrifugal weights which respectively within the region of one end are connected to the supporting element by means of an elastic supporting member.

A heretofore known rotor of the type involved is cast. Consequently, it is rather difficult to assure a sufficient precision, and as a result thereof the necessity arises of post machining the rotor for instance by turning operations. Furthermore, with a cast rotor, even without post treatment, a satisfactory uniformity of the material cannot be assured. Finally, especially with casting there also exists the danger of flaws in the material which result in non-uniformities with regard to the clutch responding at the proper desired instant.

It is, therefore, an object of the present invention to provide a rotor for a centrifugal clutch which will overcome the above mentioned drawbacks.

It is another object of this invention to provide a rotor for a centrifugal clutch as set forth in the preceding paragraph which will permit a simple non-problematic manufacture and low manufacturing costs while permitting the obtainment of the desired precision.

These objects and other objects and advantages of the present invention will appear more clearly from the following specification in connection with the accompanying drawing, in which:

FIG. 1 is a view of the rotor according to the invention.

FIG. 2 represents a section taken along the line II—II of FIG. 1 while the rivets serving as connecting elements are shown offset in the plane of the section.

FIGS. 2A and 2a represent modifications of the features of FIG. 2 with primes added to reference numerals. FIGS. 3 and 4 represent further modifications of FIGS. 1 and 2 respectively with primes added to reference numerals.

The rotor according to the present invention is characterized primarily in that the rotor is designed as a laminated packet with the layers or lamellae arranged axially one upon the other. Such axially laminated packet permits a simple non-problematic manufacture inasmuch as prefabricated elements can be used as for instance stamped out sheet metal parts. This greatly reduces the manufacturing costs and permits the desired precision without post machining and without a heat treatment.

If the rotor is made as a sheet metal packet, especially of a plurality of superimposed laminated sheets, hardened, roll hard or also non-hardened metal sheets can be used while retaining the basic form and realizing different characteristics. These possibilities can with a laminated rotor furthermore be increased by forming the indifical layers of materials of different types and different friction values.

Furthermore, the laminated construction, especially in combination with the above mentioned possibilities of variation also furnishes the best conditions under which a series of rotors can be built up without increased costs and equipment. The laminated construction of the rotor also results in reducing the soiling danger so that servicing time for such rotor is reduced and the danger of variations in the frictional value will be reduced.

Referring now to the drawing in detail, FIG. 1 shows a rotor 1 for a centrifugal clutch which is built up of laminated metal sheets 2. The metal sheets 2 are according to the specific embodiment shown designed so that each layer is formed by one piece and all of the layers are clamped together by rivets 3 to form a packet. At least some of the layers can have different heights.

It is, of course, also possible within the scope of the present invention to utilize other clamping elements as for instance screws or the like. With such thread connection in which the screws are screwed into the metal sheets, it has proved expedient in conformity with the invention to select the thickness of the metal sheets greater than the pitch of the thread.

Rotor 1 as shown in FIG. 1 comprises a central supporting element 4 which forms a hub and is provided with a central opening 5. The centrifugal weights 7 are by means of supporting elements 6 connected to the supporting member 4. The centrifugal weights 7 have an arcuate segmental shape including an outer contour extending in a circular arc and within the region of their ends adjacent the supporting members 6 respectively have a blunt end.

For the arcuate segmental centrifugal weights 7 it has proved expedient to arrange the center of the radii of said weights in an offset manner relative to the central axis 5a of the rotor in order to assure as complete as possible an engagement of the centrifugal weights. This offset is realized in the illustrated embodiment and more specifically in such a way that for the upper centrifugal weight 7a shown in the drawing the center 17a of the radii is located on the other side of the central axis 5a whereby this offset has been realized in the illustrated embodiment and more specifically in such a manner that for the centrifugal weight 7a which represents the upper centrifugal weight in the drawing, the center 17a of the radii is located on the other side of the central axis 5a and that for the centrifugal weight 7b, forming the lower centrifugal weight in the drawing, the center point 17b of the radii is located accordingly. The points 17a and 17b thus are located in the designed position respectively on a straight line which passes through the center of gravity of the respective centrifugal weight and through the central axis 5a of the rotor.

The centrifugal weights are within the region of their ends which are adjacent to the supporting members and end relatively blunt provided with sides 8 which extend nearly radially. As a result thereof, and in combination with the basic form of the supporting element 4 for the supporting members 6, which basic form is substantially square shaped, a design is obtained according to which the supporting members 6 have two arms 9 and 10 of approximately the same length. Of these arms, arm 9 extends in circumferential direction whereas arm 10 extends nearly radially. The merging between the arms 9 and 10 is effected over a relatively narrow arc 11. The arms 9 and 10 as illustrated in the drawing have approximately the same cross section. Furthermore, these arms are, as not shown in the drawing, with a one-piece design of the respective layer of the packet, so dimensioned that the axial height of the supporting members 6 also with regard to the axial cross section of the material corresponds to that of the centrifugal weights 7. With this embodiment, the elasticity of the supporting members 6 can thus be influenced only by varying the cross section in radial direction.

Within the scope of the present invention, it is also possible, by varying the effective cross section of the material of the supporting members in their axial height to influence said properties. In particular, this is possible in connection with the rotors of the type involved in which, within the scope of the present invention, the axial height of the rotor with reference to the axial cross section of the material is within the region of the centrifugal weights greater than within the region of the supporting members. Structurally, this can be accomplished in a simple manner by selecting the number of the layers greater within the region of the centrifugal weights than within the region of the supporting members or within the region of the supporting members and of the supporting element. Also axial height of the rotor with regard to the actual cross section of the material within the region of the centrifugal weights is greater than within the region of the supporting elements or members.

A further possibility also consists in that the axial height of a layer within the region of the centrifugal weights is made greater than within the region of the supporting members or the supporting pieces or of the supporting element which is also possible when the layers respectively consist of one piece. In particular, those designs with which the number of the layers within the region of the centrifugal weights is greater than within the region of the supporting members, supporting elements or supporting pieces, additionally afford the possibility by a corresponding selection of the materials on one hand to meet the requirements within the region of the supporting members and on the other hand within the region of the centrifugal weights so as for instance for the separate intermediate layers of the centrifugal weights, to utilized particularly selected materials with regard to friction.

In the illustrated embodiment, the arms 9 are relative to the circumferential surface of the centrifugal weights offset slightly inwardly. Between the arms 10 and the adjacent leading side 12 of the supporting element 4 on one hand and the radially inner confinement 13 of the respective centrifugal weight 7 carried by the other arm, there is provided a gap 14, 15 which within the region of arm 10 is narrower than within the region of supporting element 4 while the merging between the gap sections 14 and 15 occurs within the region of a central plane which extends about perpendicularly with regard to the arms 10.

Within the scope of the present invention, a rotor for a centrifugal clutch has been made which by the selection of the materials to be utilized for the individual layers and/or by the change in the effective cross section of the material of the supporting members 6, as well as with regard to the characteristic of response as well as with regard to the frictional behavior is changeable or variable to a great extent so that while utilizing a smaller number of basic elements, rotors can be prepared which have very different properties and which thus can meet also most varied requirements. This, of course, does not apply only to rotors which are equipped with two centrifugal weights as is shown for instance in the embodiment of the invention, but also to rotors which comprise at least three or more centrifugal weights 7.

It is, of course, to be understood that the present invention is, by no means, limited to the specific showing in the drawing, but also comprises any modifications within the scope of the appended claims.

What we claim is:

1. A rotor for a centrifugal clutch, which includes a plurality of axially superimposed layers, and connecting means interconnecting said layers to form said rotor as a multi-layer packet, said rotor comprising a central supporting element, at least two arcuate segmental centrifugal weights, and elastic supporting members respectively connecting one end portion of said centrifugal weights with said central supporting element.

2. A rotor according to claim 1, in which said rotor is formed of a multi-layer sheet metal packet.

3. A rotor according to claim 1, in which said rotor is formed of a plurality of superimposed laminae of sheet metal.

4. A rotor according to claim 1, in which at least some of said layers have different heights.

5. A rotor according to claim 1, in which each of said layers of said rotor forms a one-piece metal sheet.

6. A rotor according to claim 1, in which the axial height of said rotor with regard to the actual cross section of the material is within the region of said centrifugal weights greater than within the region of said supporting members.

7. A rotor according to claim 1, in which the axial height of said rotor with regard to the axial cross section of the material is within the region of the centrifugal weights greater than within the region of said supporting element and said supporting members.

8. A rotor according to claim 1, in which the axial height of said layers within the region of said centrifugal weights is greater than within the region of said supporting members.

9. A rotor according to claim 1, in which the axial height of said layers within the region of said centrifugal weights is greater than within the region of said elastic supporting members and said central supporting element.

10. A rotor according to claim 1, in which the number of said layers within the region of said centrifugal weights is greater than within the region of said supporting members.

11. A rotor according to claim 1, in which the number of said layers within the region of said centrifugal weights is greater than within the region of said supporting members and said supporting element.

12. A rotor according to claim 1, in which at least some of said layers are respectively of different materials.

13. A rotor according to claim 1, in which at least some of said layers within the region of said centrifugal weights are respectively of different material.

14. A rotor according to claim 1, in which at least some areas of the outer circumference of said centrifugal weights consist of materials with different friction values.

15. A rotor according to claim 1, in which rhe rotor at least within the region of the centrifugal weights is laminated of materials of different friction values.

16. A rotor according to claim 1, in which the center points of the radii of said segmental centrifugal weights are located outside the central axis of said rotor.

17. A rotor according to claim 16, in which said center points of said centrifugal weights are located on the respective opposite side with regard to the central axis of said rotor and within the region of a straight line extending through the center of gravity of the respective centrifugal weight and the central axis of said rotor.

18. A rotor according to claim 1, which includes at least three centrifugal weights.

19. A rotor according to claim 1, wherein said segmental centrifugal weights have an outer contour extending in a circular arc.

* * * * *